(12) United States Patent
Gaonkar et al.

(10) Patent No.: US 8,751,450 B1
(45) Date of Patent: Jun. 10, 2014

(54) METHOD AND SYSTEM FOR SECURELY CAPTURING WORKLOADS AT A LIVE NETWORK FOR REPLAYING AT A TEST NETWORK

(75) Inventors: Shravan Gaonkar, Sunnyvale, CA (US); Shankar Pasupathy, Milpitas, CA (US); Kiran Srinivasan, Sunnyvale, CA (US); Prashanth Radhakrishnan, Bangalore (IN); Garth Goodson, Fremont, CA (US); Scott Dawkins, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 260 days.

(21) Appl. No.: 13/095,740

(22) Filed: Apr. 27, 2011

(51) Int. Cl.
*G06F 17/30* (2006.01)
(52) U.S. Cl.
CPC .............................. *G06F 17/30575* (2013.01)
USPC ........................................................ 707/634
(58) Field of Classification Search
CPC .............................................. G06F 17/30575
USPC ........................................................... 707/634
See application file for complete search history.

(56) References Cited

U.S. PATENT DOCUMENTS

2006/0059163 A1* 3/2006 Frattura et al. .................. 707/10
2008/0133518 A1* 6/2008 Kapoor et al. .................... 707/6
2009/0281984 A1* 11/2009 Black ................................ 707/1

\* cited by examiner

*Primary Examiner* — Huawen Peng
(74) *Attorney, Agent, or Firm* — Perkins Coie LLP (57) ABSTRACT

Methods and system for securely capturing workloads at a live network for replaying at a test network. The disclosed system captures file system states and workloads of a live server at the live network. In one embodiment the captured data is anonymized to protect confidentiality of the data. A file system of a test server at the test network is mirrored from a captured state of the live server. An anonymized version of the captured workloads is replayed as a request to the test server. A lost or incomplete command is recreated from the states of the live server. An order of the commands during replay can be based on an order in the captured workload, or based on a causal relationship. Performance characteristics of the live network are determined based on the response to the replayed command.

31 Claims, 6 Drawing Sheets

METHOD AND SYSTEM FOR SECURELY CAPTURING WORKLOADS AT A LIVE NETWORK FOR REPLAYING AT A TEST NETWORK

FIELD OF THE INVENTION

At least one embodiment of the present invention pertains to performance testing of a processing system, and more particularly, to a method and system for capturing real-time workloads from a live network and replaying a version of the captured workloads at a test network.

BACKGROUND

Before a manufacturer ships a computer network-related product to a customer, it is important to test the product under conditions approximately identical to the conditions under which the product will operate at the customer's site, commonly referred to as a production or "live" network.

The live network may contain sensitive or mission-critical data and operations; therefore, it is desirable to perform any troubleshooting, performance testing, or other analysis offline from the live network and, preferably, on a test network that replicates as close as possible the live network. However, recreating the environment of the live network at a separate test network posses difficulties for the customer and vendors who engage in performance testing of network-related products.

One problem faced by customers and vendors attempting to replicate a live network with a separate test network is the high-degree of site knowledge needed to understand the complexities of the live network environment. A customer's live network environment often evolves over time to satisfy new demands that can result in a myriad of on-going changes to equipment in the live network. For instance, it is common for a production network to receive new and/or updated network equipment to upgrade a level of available network bandwidth to enterprise services, for example. Similarly, additional and different storage systems are commonly added to live networks to meet the increasing demands for data storage. Each piece of equipment within the live network may have a different operating system, network demand requirement, and specialized application unavailable to third-party vendors. Therefore, understanding and navigating the complexities of the live network environment is a difficult problem faced by customers and vendors seeking to replicate that environment to a test network.

Another problem faced when replicating a live network is the high cost of purchasing test equipment identical to equipment at the live network. Even if only key pieces of equipment of the live network are purchased, the cost to the customer and/or vendor can exceed budget and hinder the ability to produce a profit.

An additional challenge is security. A live network may carry mission-critical and/or confidential information. Corporations often use their live networks to share private information, trade secrets, and financial information throughout the corporation while shielding the release of sensitive information to the public and/or other corporations and agencies. Sensitive information may be collected as part of the replication of a live network to a separate test network; however, the test network is often operated by a third-party vendor who may not have the security implementations necessary to protect the sensitive data from being released. Therefore, some entities may find it unreasonable to allow replication of their network environment, even at the expense of the live network's efficiency and performance.

Previous attempts to overcome the above issues have failed to provide a method or a system to accurately and securely capture real-time (inline) workloads that use a variety of communication protocols. The prior art is limited to replaying workloads using a single protocol type, such as Network Filing System (NFS), and fails to focus on protecting data security.

Therefore, the problem of an inability to accurately, economically, and securely recreate a live network environment hinders network operators from realizing increased efficiency of operation, which adversely affects users accessing services delivered by the live network.

SUMMARY

Introduced herein are methods and a system for transparently capturing workloads at a live network and replaying the workloads at a test environment, while maintaining the security of information captured at the live network.

The live network in one embodiment includes a server ("live server") and a client ("live client") connected via a network switch. The live server communicates one or more workloads via the live switch to/from the live client. An initial state of the live server is an image of the live server's file system objects, such as data and meta data, that are captured at the live server for use at a test network, described below. In one embodiment, a processing system ("Capture Replay System" or ("CRS")) coupled to the live network captures the initial state of the live server by copying some or all of the file system objects at the live server. The initial state can be utilized with a final state for verification and data recovery purposes, as explained below. The CRS captures and records data and metadata of objects stored at the file system, such as objects' create-times, sizes, and last access-times, for example. In another embodiment, the CRS captures into the initial state a data block layout utilized by the live server to store file system objects.

A "workload" is a series of communications between two entities, such as the live server and the live client. The CRS captures a workload communicated between the live server and the live client transparently, i.e., in a manner that is not detected by either the live server or the live client within the live network environment. One technique to capture the workload transparently is to utilize a technique known as "port mirroring." Port mirroring is a technique known in the art used to replicate, at a capturing port of the network switch, the workload communicated between the live server and live client. As part of port mirroring, the workload is communicated across two ports of the network switch, one port being connected to the live server and the other being connected to the live client. As the workload is communicated across the two ports, each portion (packet) of the workload is duplicated at a third (capture) port that is connected to the CRS. Therefore, the capturing occurs, transparently, i.e. without the knowledge and/or cooperation of either the live server or the live client.

The disclosed methods and system can capture different types of workloads at very high-speed with little to no loss of data. For example, to decrease the likelihood of a performance bottleneck that can lead to dropped packets, the CRS can store captured packets at a rate matching the data rate at which packets arrive from the live network. In one embodiment, the CRS performs bandwidth matching by parsing the packets as they arrive from the live network, combining multiple packets together, and compressing the data within the packets into a format sized to allow storage of the packets at a rate identical to the rate at which the packets arrive from the live network.

The CRS is protocol agnostic in that it can capture and replay workloads that use a variety of different types of communication protocols. One type of workload uses a network storage protocol to read/write data to a storage device or storage system. The captured workload can include various commands utilizing one or more different protocols, such as Network Filing System (NFS), Fiber Channel (FC), Common Internet File System (CIFS) and Internet Small Computer System Interface (iSCSI) for example. A command can have data (a "payload") associated with the command. The command may be, for example, a request command to read or write data to a storage device and/or a response command based on a previous request. In one embodiment, a captured command is converted into another format, which is used to replay the command and payload at a test network, as described below.

In one embodiment, after the capture of the initial state and the workload, the CRS captures a final state of the live server by copying some or all of the file system at the live server. As previously described, the CRS captures and records data and metadata of objects stored at the file system, for use in verification and data recovery analysis. When a command from the captured workload is incomplete or lost, a replacement command can be generated using data and information collected at the live network.

In situations where data security is an issue, the payload in the workload and the data within the initial and final states can be anonymized to protect the security of data. In one such embodiment, the payload, initial state, and final state are made anonymous ("anonymized") by the use of a hashing algorithm. That is, the data are modified such that original content in the data cannot be identified from the anonymized data.

Once the initial state is captured at the live network, a test network can be provisioned to replay the captured workloads. The test network includes a test server coupled to the CRS via a network switch. The test server receives a file system created by using, for example, a data imaging process, to copy portions of the initial state to the test server, for example. The CRS replays to the test server, via the network switch, a captured command and payload. The replayed command is sent as a request to the test server. The test server can be configured based on a network configuration of the live server such that the replayed traffic is routed to the test server without modifying a destination address within the workload. If the workloads were anonymized, the anonymized version of the payload is replayed. The response from the test server is compared against a recorded response of the live server.

In one embodiment, after the replay process completes, a final state of the test server is generated and verified against the final state of the live server to determine a degree of accuracy of the replay process.

The solution presented here overcomes the inefficient, insecure, and costly problems of the prior art by transparently capturing, without packet loss, actual workloads at a live network to replay at a test server, thus removing the necessity for deep, specialized knowledge of a particular network/system topology. Furthermore, by utilizing captured workloads of the live network at the test network, there is no need to purchase costly, duplicate equipment for the test network. Additionally, security and privacy concerns are addressed by anonymizing data captured at the live network.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the technique introduced here. Occurrences of such phrases in this specification do not necessarily all refer to the same embodiment.

Figure 1:
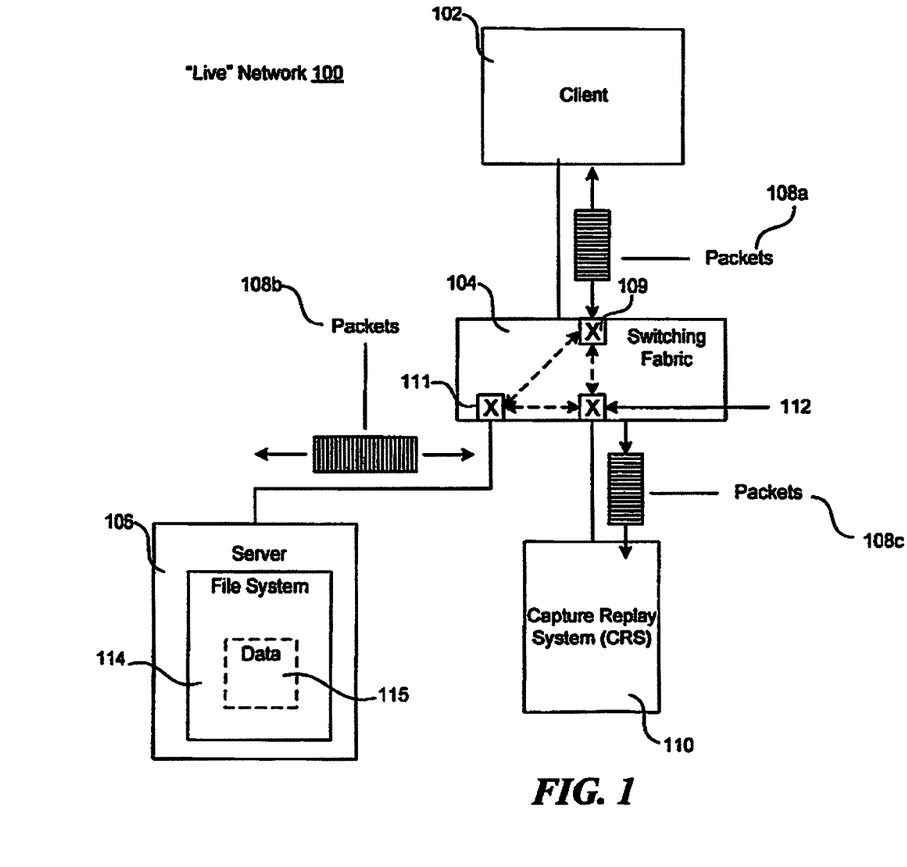
FIG. 1 illustrates a live network environment in which at least some aspects of the present invention can be implemented.

FIG. 1 illustrates a "live" network environment 100 in which at least some aspects of the technique introduced here can be implemented. It is noted that the network environment described here is for illustration of one type of a configuration in which the techniques can be implemented, and that other network configurations and schemes can be used for implementing the techniques.

The live network environment 100 includes a server 106, a client system 102, a switching fabric 104 having ports 108, 109, and 112, a capture replay system (CRS) 110, and packets 108a, 108b, and 108c.

The server 106 may be, for example, a conventional computing system such as a personal computer (PC) or server-class computer, equipped with a file system 114, as described below. Alternatively, the server 106 can be a special-purpose processing device, such as a dedicated network storage server. An example of such a dedicated server is one of the FAS family of storage server products available from NetApp®, Inc of Sunnyvale, Calif. As further described below, the server 106 can send and receive workloads using packets 108b to/from client 102 via switching fabric 104.

The file system 114 is a logical structure that organizes data files ("objects"), references to objects, and/or metadata as a hierarchical structure of named directories and files (collectively referred to herein simply as "data" 115). The data 115 may be stored in server 106, or in a separate storage device or mass storage subsystem (not shown) coupled to the server 106. Each data file may be implemented as a set of data blocks configured to store information, as further described below. In certain embodiments, the file system 114 is a write-anywhere file system having the ability to "virtualize" storage space. In one illustrative embodiment, an operating system (not shown) operating in the server 106 implements the file system 114. The operating system can be, for example, a version of the Data ONTAP® operating system available from NetApp, Inc., which implements the Write Anywhere File Layout (WAFL®) file system. However, other storage operating systems are capable of being adapted, enhanced or created for use in accordance with the principles described herein.

The server 106 can connect to the client system 102 and CRS 110 via the switching fabric 112. The switching fabric 112 can utilize any connection method known in the art, such as Ethernet, Token Ring, Fiber Distributed Data Interface (FDDI), or Transmission Control Protocol/Internet Protocol (TCP/IP). The switching fabric contains ports 109, 111, and 112 to communicatively couple the server 106, client 102, and CRS 110, respectively. The switching fabric 104 manages communications between the server 106, client 102, and CRS 110 by routing packets 108a, 108b, and 108c to a proper destination device (102, 106, and/or 110) connected to the switching fabric 104.

One or more of the switching ports 109, 111, and 112 can be configured for port mirroring. Port mirroring is a conventional technique used to send a copy of packets received at one switch port to another switch port. For example, FIG. 1 shows mirrored port 112 configured to receive packets 108a and 108b, as packets 108c. Thus, any packets 108b and 108a destined to/from server 106 and/or client 102 are copied to port 112 for delivery to CRS 110.

The client 102 may be a conventional computing device, such as a PC, server-class computer, smart phone or other type of computing system capable of connecting to the switching fabric 104, either by wire or wirelessly. As further explained below the client may send and receive workloads as packets 108a to/from server 106 via switching fabric 104.

CRS 110 may be a conventional computing device, such as a PC, server-class computer or other computing system capable of connecting to the switching fabric 104. The CRS 110 may perform various functions and management operations, such as capturing an initial and final state of server 106, capturing workloads in the form of packets 108a and 108b, creating a test server file system based on the initial state, regenerating lost or damaged data within a workload, and replaying a version of the workload at a test network.

It is noted that, within the live network environment 100, any other suitable numbers of servers, clients, switches and/or mass storage devices may be employed.

Figure 2:
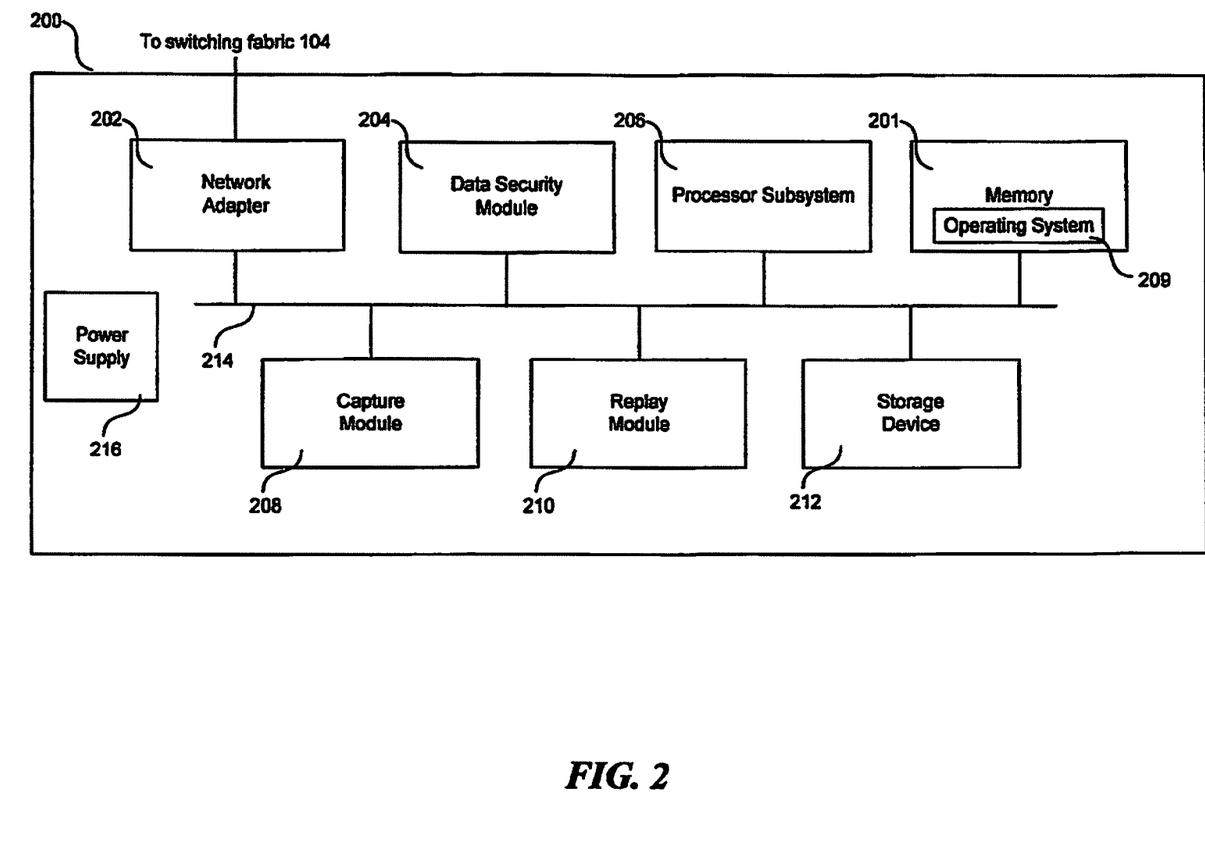
FIG. 2 is a high-level block diagram showing an example of the hardware architecture of a processing system that can implement the capture and replay procedures.

FIG. 2 is a high-level block diagram showing an example of the hardware architecture of a CRS 200 that can implement the capture and replay procedures described herein. CRS 200 can be representative of CRS 110 in FIG. 1.

CRS 200 includes a processor subsystem 206 that includes one or more processors. The CRS 200 further includes memory 201, a network adapter 202, a storage device 212, a data security module 204, a capture module 208, and a replay module 210 all interconnected by an interconnect 214 and powered by a power supply 216.

The memory 201 illustratively comprises storage locations that are addressable by components 202 through 212 for storing software and/or firmware program code and data structures associated with the techniques introduced here. The processor subsystem 206 and components may, in turn, comprise processing elements and/or logic circuitry configured to execute the software code and manipulate the data structures. The operating system 209, portions of which are typically resident in memory and executed by the processor subsystem 206, functionally organizes the CRS 200 by (among other things) configuring the processor subsystem 206 to invoke and/or execute capture and replay related operations in support of some aspects of the technique introduced here. It will be apparent to those skilled in the art that other processing and memory implementations, including various computer readable storage media, may be used for storing and executing program instructions pertaining to the technique introduced here.

The operating system 209 can be software, such as Microsoft Windows®, MAC OS X®, or Linux® that manages the components 202 through 212 and provides common services for efficient execution in support of some aspects of the technique introduced here.

The network adapter 202 enables the CRS 110 to communicate with server 106 and client 102 by sending and receiving packets 108c according to pre-defined protocols known in the art. The network adapter 202 includes circuitry and one or more ports to couple the CRS 200 to the switching fabric 104. The network adapter 202 can include one or more network adapters used by the CRS 110 to capture and replay packets 108c.

The storage device 212 stores data and information in support of the techniques introduced here. The storage device 212 can be implemented as one or more disks (e.g., a RAID group) or any other type of mass storage device(s). Alternatively, or additionally, such data may be stored on any type of attached array of writable storage media, such as magnetic disk or tape, optical disk (e.g., CD-ROM or DVD), flash memory, solid-state disk (SSD), electronic random access memory (RAM), micro-electro mechanical media and/or any other similar media adapted to store information. However, as illustratively described herein, the information is stored on a single non-volatile mass storage device 212.

The techniques introduced above, including at least modules 204, 208, and 210, can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The capture module 208 captures a "state" of the server 106. A state includes a point-in-time image ("snapshot") of the file system's 114 objects' and objects' metadata at a particular point in time, such as that provided by the Snapshot™ technology available at NetApp, Inc. of Sunnyvale, Calif. To capture a state, the capture module 208 accesses the server 106 via the switching fabric 104 to record data 115 at the file system 114. Recorded data 115 may include the file system namespace hierarchy, file system objects and meta data associated with the objects, such as, the objects' creation times, sizes, last access times, etc., for example. The aforementioned state, which represents the "logical view" of the file system, can be captured using common software utilities, such as 'find' and/or 'cpio.' Cpio is a binary file archiver that can operate on the file system namespace to archive files, directories, and metadata into a single archive. "Find" is a terminal command tool that can be used to examine the file system. For instance, the command string "find .|xargs -n 1 ls -al" can be used to examine one level of the file system to capture files and metadata. In addition, the recorded data 115 may include metadata indicating the data block layout used to store the objects, as described below and illustrated in FIG. 3. Such state represents the "physical view" of the file system.

Figure 3:
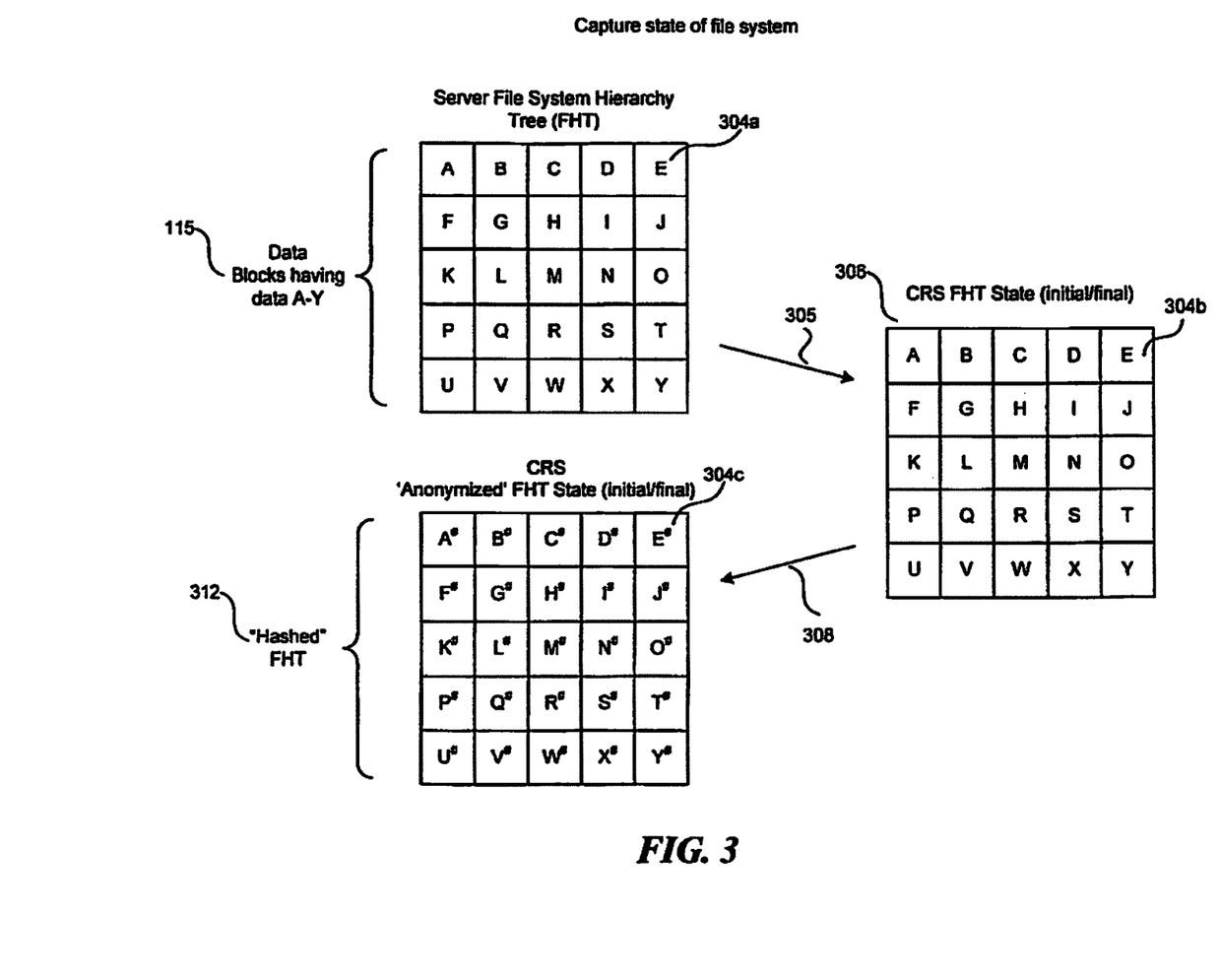
FIG. 3 illustrates the process of capturing a state of a server and anonymizing the captured state.

FIG. 3 illustrates an example of the process of capturing a state of a server 106. Data 115 is illustrated as a series of data blocks having data 'A' through 'Y'. Each data block represents a physical location having a corresponding portion of data 115. For example, data block 304a contains data 'E'. The capture module 208 accesses the file system 114 and creates (305) a state 306 that replicates data 115. As shown in the example, the state 306 includes a copy of data 'E' 304*b* reproduced from data block 304*a*. An 'initial' state is a state that is captured prior to the capture of a workload, and a 'final' state is a state captured after the capture of the workload, as described below. States can be stored at the storage device 212 and used to verify that information collected at the live network environment 100 is accurately reproduced at the test network 500, and for other purposes described below.

Additionally, a data security module 204 of the CRS 200 can create (308) an "anonymized" state 312. Anonymizing data protects customer privacy and confidentiality and is a process of obfuscating the original content of the data with randomized and/or encoded content. One technique for anonymizing data is by the use of a one-way hashing function ("hashing function"). A hashing function obfuscates the original content of data by encrypting the data into a hash value. A hash value secures information in a randomized format that is mathematically and computationally difficult to recover the original content. The values returned by a hash function are called hash values, hash codes, hash sums, checksums or simply hashes. Various hashing functions can be utilized by the data security module 204, such as MD2, MD4, MD5, CRC, SHA, SHA256, or other mathematical algorithms capable of implementing a hashing function. The capturing module 208 creates a correlation (or "mapping") 111 associating the anonymized (hashed) state 312 with the non-anonymized state 306. The mapping 111 is stored in the storage device 212 of the CRS 110 and accessible to the other modules of the CRS 200.

Figure 4:
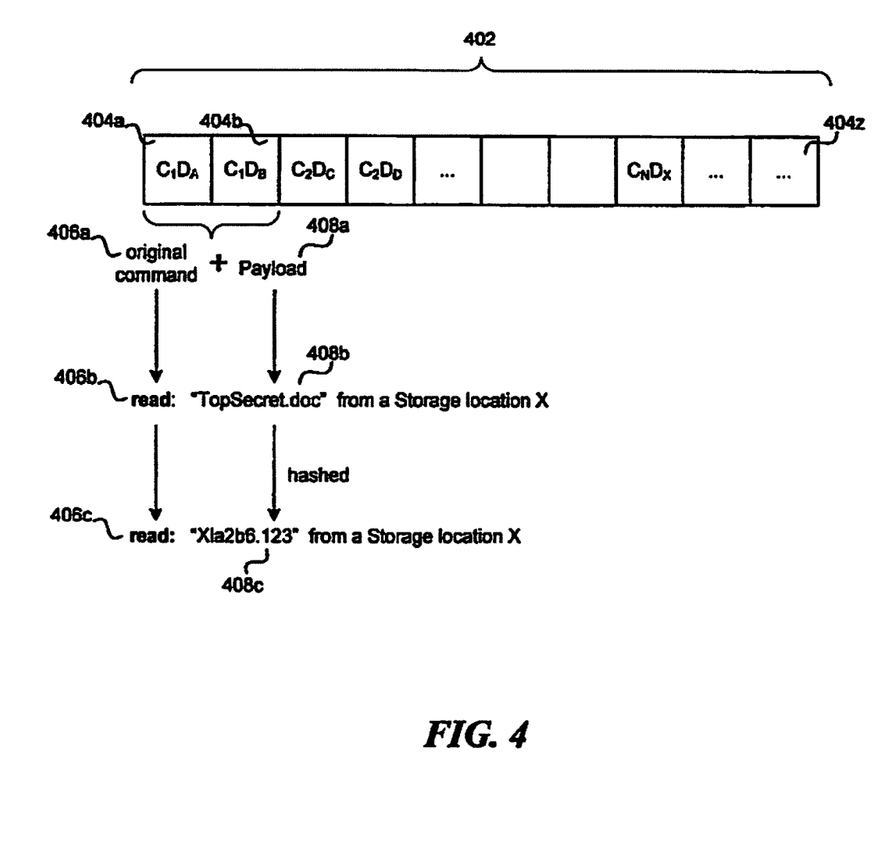
FIG. 4 illustrates the recreation of commands and payload from packets captured at the live network.

After the capture of the initial state, the capture module 202 captures a "workload" from server 106 and client 102. A workload is a series of communications between the server 106 and client 102, usually in the form of packets sent across the switching fabric 104. The workload is communicated in "real-time," such that one part of the series of communications (e.g. the "request") is substantially immediately preceded by another part of the series of communication (e.g. the "response"). The capture module 202 is storage protocol independent in that it can capture a variety of different types of storage protocols, such as NFS, Fiber Channel, CIFS and iSCSI for example. As illustrated in FIG. 4, a workload portion 402 can have several packets 404*a* through 404*z*. Each packet within the workload 402 can contain portions of data 115 and additional information, such as storage protocol information. For example, packets 404*a* and 404*b* include a storage command, $C_1$, and data (payload), $D_A$ and $D_B$. $C_1$ may represent a command 406*a* with payload 408*a* originally sent from client 102 to server 106. For purposes of illustration, the original command 406*a* is shown as a read request command 406*b* requesting the server 106 to read the payload ("TestServer.doc") 408*b* from a storage location ('X'), where 'X' represents a physical location at the storage device 212, for example.

In a particular embodiment, the data security module 204 can generate an anonymized payload 408*c* of the payload 408*b* to protect the security of information within the live network environment 100, while preserving the format of the original command 406*c*. As described above, the data security module 204 uses a hashing function to convert payload 408*b* into a format 408*c* unrecognizable and extremely computationally difficult to convert back into its non-hashed format 408*b*. The original command 406*a*-406*c* does not get anonymized in at least one embodiment, assuming the command itself (e.g. reading information from a storage location), does not reveal any confidential information. As an illustrative example, an anonymized version of the command and payload "read: TestServer.doc from data block 5 on disk 2" may be "read: X1a2b6.123 from data block 5 on disk 2," for example.

The capturing can be performed in a manner that is not detected by either the server 106 or client 102. For instance, capturing can utilize the technique of port mirroring, as previously described, or other techniques known in the art, such as by utilizing pass-through network cards. For purposes of illustration, the switching fabric 104 is configured to mirror packets 108*a* and/or 108*b* as seen by ports 109 and 108, respectively, to a mirror port 112. The mirrored packets 108*c* are sent from the mirror port 112 for delivery to the capture module 202 via the network adapter 202.

The capture module 202 captures the mirrored packets 108*c* and extracts and records commands and payload from the packets 108*c*. Continuing the above example, the capture module 202 can extract and reproduce, from packet 404*a* and 404*b*, the read request command 406*b* and payload 408*b*. The reproduced command 406*b* and payload 408*b*, or anonymized payload 408*c* when confidentiality is a concern, are recorded at the storage device 212 for replay, verification and other purposes explained below.

A response (not shown) to the read request command 406*b* is similarly captured, parsed, stored and reproduced into an original command 406*a* and payload 408*a*. The reproduced command 406*b* and payload 408*b*, or anonymized payload 408*c* when confidentiality is a concern, may be packaged into a format readable by the replay module 210.

In one embodiment, the capture module 202 can capture the mirrored packets 108*c* with little to no packet loss. One technique to avoid packet loss during the capturing process is to compress the packets 108*c* into an efficiently small size such that the CRS 110 can store the compressed packets at the storage device 212 at a data rate at which the mirrored packets 108*c* arrive from the live network environment 100.

For example, in an exemplarily embodiment, to decrease the likelihood of a performance bottleneck that can lead to dropped packets, the CRS 110 can perform bandwidth matching by parsing the packets 108*c* as they arrive from the live network environment 100, combining multiple packets together, and/or compressing the data within the packets into a format sized to allow storage of the packets at the storage device 212 using a rate equal to the rate at which the packets arrive to the CRS 100.

Figure 5:
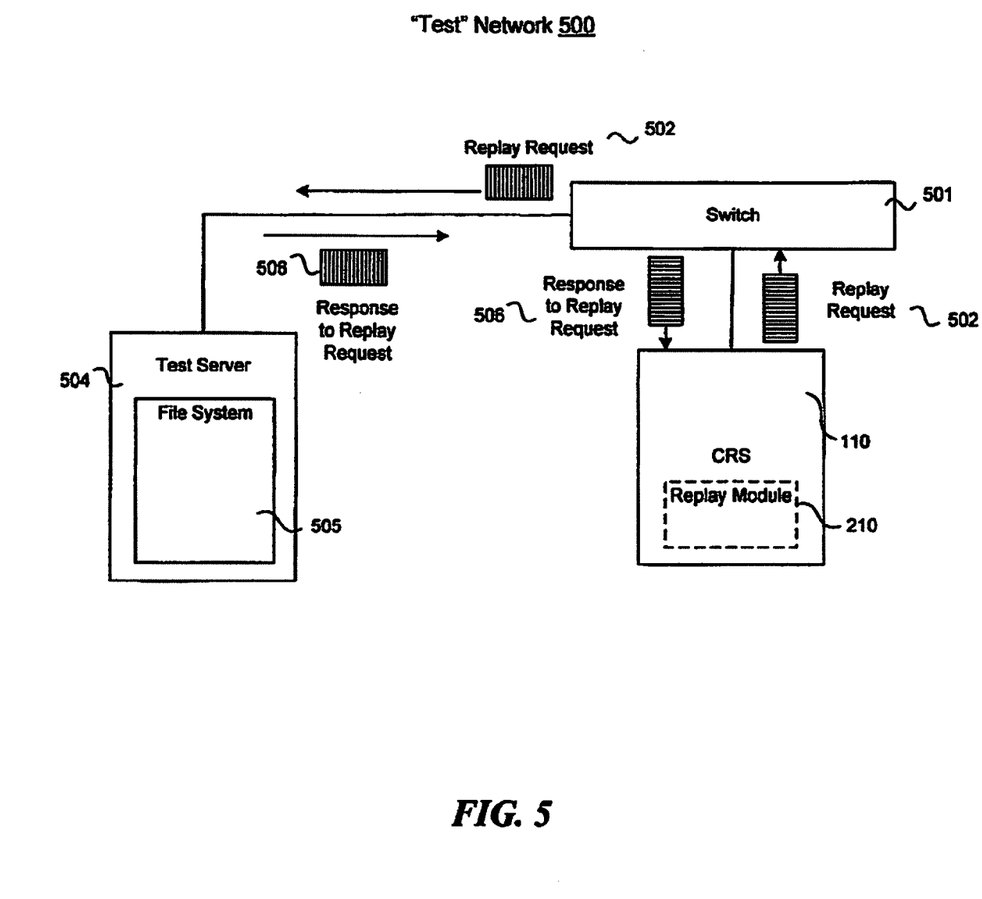
FIG. 5 illustrates a test network environment in which at least some aspects of the present invention can be implemented.

As illustrated in FIG. 5, the replay module 210 in the CRS 110 sends a version of the captured workload to a test server 504 at a test network environment 500. FIG. 5 illustrates an example of a test network environment 500 in which the at least some aspects of the technique introduced here can be implemented. The test network environment 500 includes the CRS 110 connected to a test server 504 via a switching fabric 501.

The test server 504 may be, for example, a conventional computing system such as a personal computer (PC) or server-class computer, equipped with a file system 505. Alternatively, the test server 504 can be a special-purpose processing device, such as a dedicated network storage server. An example of such a dedicated server is one of the FAS family of storage server products available from NetApp®, Inc of Sunnyvale, Calif.

The test server 504 can be replicated based on the live server 106. In one embodiment, the test server 504 can be created using the data 115 of the initial state captured at the live server 106. The CRS 110 can create the test server's 504 file system 505 by using a snapshot to copy all or portions of the content and format of the initial state into the file system 505. The file system 505 can be created from an image of the non-hashed initial state, such as state 306, or the file system 505 can be created from an image from an anonymized initial state, such as state 312. If a data block layout was captured as part of the state 306 or 312, the CSR 110 will adhere to that layout as it creates the file system 505.

The test server 504 connects to the CRS 110 via the switching fabric 501. The switching fabric 501 utilizes the same, or the same, connection method as utilized by the switching fabric 104 in the live network environment 100. The switching fabric contains ports (not shown) to communicatively couple the test server 504 and CRS 110. The switching fabric 501 manages communications between the test server 504 and CRS 110 by routing replay commands 502 and 506, typically in the form of packets, to/from the test server 504 and/or the CRS 110.

The replay module 210 works in conjunction with the network adapter 202 to send to the test server 504 via the switching fabric 501a replay request 502. In a particular embodiment, the replay request 502 is generated from the reproduced command 406b and payload 408b (or, anonymized payload 408c), captured from the workload and recorded at the storage device 212.

Continuing with the previous example, the replay request 502 may include the original command 406b, $C_1$, and the non-hashed payload 408b, $D_a$ and $D_b$, captured from the live network environment 100. In this scenario, the replay request 502 is a request to "read:TestServer.doc from storage location X", where "X" is a data block location at the storage device 212.

Alternatively, when an anonymized payload 408c is utilized, the replay request 502 may include the original command 406c and the hashed version of the payload 408c. In this scenario, the replay request 502 is a request to "read: X1a2b6.123 from storage location X", where X1a2b6.123 is the hash value of "TestServer.doc" 408b, as indicated in the correlation recorded by the capture module 208 and stored in storage 212.

The replay module 210 sends the replay request 502 for delivery to the test server 504, and in response, the test server 504 replies by sending a response 506 for delivery to the replay module 210 at the CRS 110. In one embodiment, to verify a degree of accuracy of the replay with the captured data of the live network environment 100, the response 506 is compared against a corresponding response (not shown) captured in the workload portion 402. For example, if the contents of the payload in the response 506 match the contents of the payload in the previously captured response from the live network environment 100; the response 506 is deemed accurately reproduced. However, in some scenarios and as further explained below, the replay module 210 may determine that the response 506 is not accurately replayed.

There are many conditions under which a response 506 may not be accurately replayed. For example a "file create" command could be lost during the capture process at the live network environment 100 and a subsequent command, "file read," may be sent to read the file. The replay module 210 can identify that there is a read command for a non-existing file and recreate the lost "file create" command. The replay module 210 can fix the replay commands by adding the recreated "file create" command into the correct sequence used at the live network environment 100.

Once all replay requests 502 and responses 506 for a given workload have completed, the CRS 110 creates a final state of the test server 504, in the manner described above for the initial state of the live server 106. The final state of the test server 504 is compared with the stored final state of the live server 106 to verify a degree of accuracy of the capture-replay performance.

In some scenarios, the capture module 208 may not receive all of the packets of a particular workload; or, a portion of the received workload may have errors or omissions. For example, due to high network usage at the live network environment 100, a packet of a particular workload may be dropped. In these situations, the capture module 208 can determine which packets are lost or corrupted by comparing the data of the initial state, captured workload, and the final state. The replay module 210 can recreate the missing or corrupted portions of the workload by utilizing data within the initial state and captured workload. For example, if after capturing the initial state 306 of the live network environment 100, a request to write payload 'E' to data block 304a is corrupted, the replay module 210 can determine that the corruption (or missing data) has occurred based on the missing/corrupted data in the initial state 306 and a subsequent request to 'read' payload 'E' from data block 304a, for example. The replay module 210 can recreate the missing/corrupted payload 'E' by extrapolating payload 'E' from the subsequent request and add it to data block 304b of the initial state 306.

In another example, a "file create" command may be lost at the capture module 208 but successfully delivered to a storage controller along with a delivery of a subsequent "write to file" command. When the replay module 210 creates the replay sequence for replaying at the test network 500, the replay module 210 can identify that the "file create" command is missing. The replay module can identify that the "file create" command is missing by comparing the current state of the file system 505 of the test server 504 with the "write to file" command and determine that the "file create" command was sent at the live network environment 100 but never delivered to the capture module 208.

In particular embodiments, a timing or order of the replay requests 502 is configurable. One scenario in which configuring replay timing is desirable is where the live network environment 100 experiences network fluctuations that cause responses to be captured out of their natural order. For example, the client 102 may send to the live server 106 a first request to read 'A' and, in response, the live server 106 replies by sending a first response having data 'A'. After receiving data 'A', the client 102 may send a second request to read 'B' and, in response, the live server 106 replies by sending a second response having data 'B'. This is the natural, causal order of a request-response command pair. However, due to network congestion, for example, the second response may reach the CRS 110 before the first response. The CRS 110 recognizes the order in which responses are received.

The replay module 210 is configured to adjust the sending of replay requests 502 based on the order as received at the live network environment 100, or based on the natural, causal relationship of the request-response command pair. For example, to send replay requests 502 in an order as seen at the live network environment 100, the replay module can send the requests 502 based on time-stamps of the original requests, indicating when the original requests were captured at the live network environment 100.

Alternatively, the replay module 210 can adjust the order of sending a replay request 502 based on the natural, causal relationship of the request-response command pair, as recorded at the live network environment 100. For example, the replay module 210 may send a request 502 and delay sending a subsequent request until an expected response is received, such as a response corresponding to a response captured and recorded by the capture module 208 at the live network environment 100.

After performing the capture-replay process, the CRS 110 can analyze statistics for determining performance characteristics useful for enhancing the live network environment 100. For example, an analysis of the capture-replay process may indicate that a particular file, perhaps large in size, is requested several times per day by the client 102, causing a degradation of performance as seen at the live server 106 and/or switching fabric 104. Based on the analysis, the live network environment 100 may be augmented with a caching system having the large file. The caching system can be strategically placed within the live network environment 100 in a location close to the requesting client 102, for example, such that the live server 100 and/or switching fabric 104 are not accessed when the client 102 requests the large file.

Figure 6:
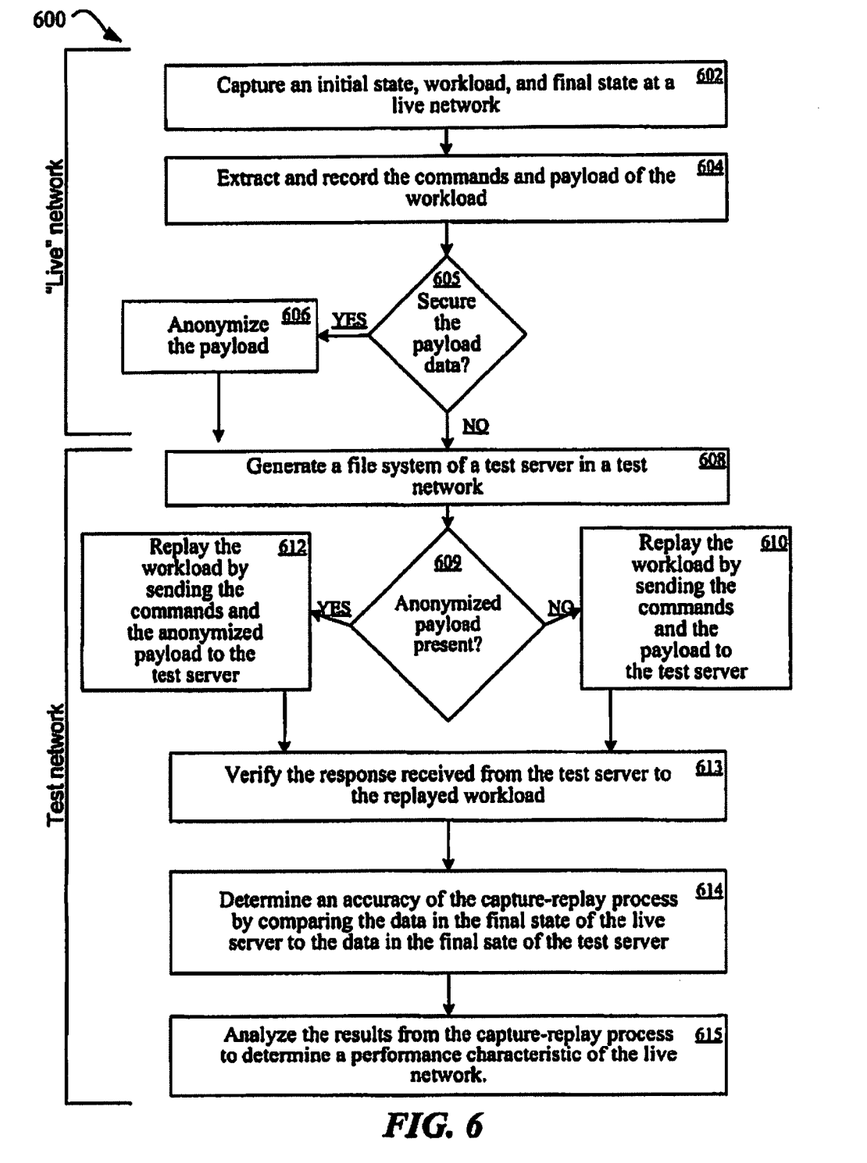
FIG. 6 is a flow diagram of a process for capturing a workload at a live network and replaying a version of the workload at a test network to determine a performance characteristic of the live network.

FIG. 6 is a flow diagram of a process 600 for capturing a workload 402 at a live network environment 100 and replaying a version of the workload at a test network 500.

The process 600 begins at the live network environment 100, with steps 602-606. If at step 602 where an initial state 304b, workload 402, and final state 304b are captured at a live network environment 100. As previously described, the initial state and final state contain objects and objects' metadata that are captured into a respective state. The initial state is captured before the workload is captured, and the final state is captured after the workload is captured. The workload 402 includes commands 406a and payload 408a, which may be in the form of packets. The initial state, final state, and workload are recorded by the CRS 110 for later use (not shown). At step 604 a process of extracting the commands 406b and payload 408b from the packets is executed.

If there are data security and/or privacy concerns (step 609), then the payload can be made anonymous, in step 606. Data in the payload can be made anonymous by encrypting the data using a hashing function, the result of which is a hashed-version of the payload (referred to as an "anonymized payload"), as described above. However, the payload may optionally be left in its original format 408b.

The process continues at the test network 500, with steps 608-615. Step 608 describes a process of generating a file system of a test server 504 in a test network. The test sever 504 is a replica of the live sever 106 and receives from a CRS 110 a file system created from the initial state of the live server 106, as previously described. If the payload was anonymized (step 609), for example as described in step 606, then at step 612 the workload is replayed to the test server 504 by using the original command 406c and the anonymized version of the payload 408c. However, if an anonymized payload was not created, the original command 406b and the non-hashed version of the payload 408b are replayed to the test server 504 as a replay request 502 at step 610.

At step 613 the test server's response 506 is compared to a previously captured responses 502 from the live network environment 100, as previously described. The comparison is done to determine if the response 506 matches the corresponding response previously recorded at the live network. At step 614, further verification occurs after the capture-replay process has completed by comparing data in the final state of the live server 106 to data in the final state of the test server 504. If the data of the final state of the live server 106 is the same as the data of the final state of the test server 504, the CRS 110 may indicate a successful verification. However, if the CRS 110 determines that the data is missing, or corrupted, the CRS may recreate the portion of the workload having the data and replay that workload to the test server 504 to regenerate the missing or corrupted data.

At step 615 results from the capture-replay process are analyzed to evaluate one or more performance characteristics of the live network environment 100, or individual components thereof, such as server 106. Based on the performance characteristic(s), the live network environment 100 or individual components thereof potentially can be modified to enhance efficiency and performance. For example, an analysis of the capture-replay process may indicate that a particular file, perhaps large in size, is requested several times per day by the client 102, causing a degradation of performance as seen at the live server 106 and/or switching fabric 104. Based on the analysis, the live network environment 100 may be augmented with a caching system having the large file. The caching system can be strategically placed within the live network environment 100 in a location close to the requesting client 102, for example, such that the live server 100 and/or switching fabric 104 are not accessed when the client 102 requests the large file.

The techniques introduced above, including at least modules 204, 208, and 210, can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the technique introduced here has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-readable memory storing instructions computer-executable instructions, comprising:
   instructions for capturing real-time data of a first processing system on a first network, wherein the real-time data includes a command having a payload, and wherein the capturing is performed independently of a storage protocol used to send the command via the first network;
   instructions for modifying the payload such that an original content of the payload cannot be identified from the modified payload;

instructions for generating replay traffic based on a live network traffic of the first network, wherein a portion of the replay traffic includes the command and the modified payload; and instructions for sending the replay traffic including the command and the modified payload to a second network so that the second network can replay the command and the modified payload, wherein a second processing system of the second network has a file system configured based on an initial state of a first processing system of the first network;

instructions for evaluating a performance characteristic of the first processing system of the first network based on a response of the second network to the replay traffic.

2. The computer-readable memory of claim 1, wherein to perform the capturing of the real-time data independently of the storage protocol is to capture the real-time data irrespective of a type of storage protocol used to send the command via the first network, and wherein a type of storage protocol is selected from a group of storage protocols consisting of Fiber Channel, CIFS and iSCSI.

3. The computer-readable memory of claim 1, wherein the first network is a live network, the second network is a test network, and the capturing is performed in such a manner that the first processing system has no knowledge of the capturing of the real-time data.

4. The computer-readable memory of claim 3, wherein the capturing is performed by using port mirroring.

5. The computer-readable memory of claim 1, further comprising:

instructions for determining an initial state of the first processing system, wherein the initial state includes a copy of an original dataset of the first processing system at a time before the capturing of the real-time data; and instructions for determining a final state of the first processing system, wherein the final state includes a copy of a final dataset of the first processing system at a time after the capturing of the real-time data.

6. The computer-readable storage of claim 5, wherein the instructions further comprise:

instructions for determining a missing or corrupted data in the final state by comparing the final dataset of the final state with the original dataset of the initial state; and instructions for recreating the missing or corrupted data based on a portion of the original dataset of the initial state.

7. The computer-readable memory of claim 5, further comprising instructions for modifying a portion of the copy of the original dataset.

8. The computer-readable memory of claim 7, wherein the portion of the copy of the original dataset is modified by using a hashing algorithm.

9. The computer-readable memory of claim 7, further comprising instructions for maintaining a mapping between data in the original dataset and the modified portion of the copy of the original dataset.

10. The computer-readable memory of claim 5, wherein the initial dataset and the final dataset include meta data associated with a respective first and second datasets of the first processing system.

11. The computer-readable memory of claim 10, wherein the meta data is selected from a group consisting of a create time, a size, and a last access time.

12. The computer-readable memory of claim 10, wherein the meta data includes a data block layout used by the first processing system to store the datasets.

13. The computer-readable memory of claim 1, wherein the second network has a processing system having a file system created based on the first processing system, and wherein the file system of the processing system at the second network utilizes a data block layout used by the first processing system.

14. The computer-readable memory of claim 13, wherein the file system of the second processing system is created from a mirror image of a file system of the first processing system.

15. The computer-readable memory of claim 1, further comprising instructions for verifying a response of a second processing system to a replayed command captured from the real-time data by comparing the response of the second processing system to a response determined from the captured real-time data of the first processing system.

16. A method comprising:

determining an initial state and a final state of a first networked processing system on a live network, wherein the initial state includes a copy of an original dataset from the first processing system;

modifying a portion of data in the initial state such that an original content of the portion of data cannot be identified from the modified portion of data;

capturing live network traffic associated with the first networked processing system, wherein the live network traffic includes an original command, and the original command includes a payload having a copy of a portion of the data in the original dataset;

modifying the payload of the command of the live network traffic such that an original content of the payload cannot be identified from the modified payload;

generating replay traffic based on the live network traffic of the first networked system, wherein a portion of the replay traffic includes the original command including the modified payload;

sending the replay traffic to a second networked processing system at a test network to simulate the live network traffic of the first networked processing system, wherein the second networked processing system has a file system configured based on the initial state of the first networked processing system; and determining a performance characteristic of the first networked processing system based on a response of the second networked processing system to the replay traffic.

17. The method of claim 16, further comprising maintaining a mapping between data in the original dataset and the data in the initial state, and wherein sending the replay traffic further includes sending the original command after a response to a previously sent original command is received from the second networked processing system.

18. The method of claim 16, wherein sending the replay traffic further includes sending the original command in identical order to an order that the original command was captured relative to another original command at the live network.

19. The method of claim 18, wherein the original command of the replay traffic is sent at a time based on a time stamp associated with the capture of the original command at the live network.

20. The method of claim 16, wherein generating replay traffic further includes determining an incomplete or missing original command from the captured live network traffic and creating a replacement for the incomplete or missing original command, based on the data in the initial state and the final state of the first networked processing system.

21. The method of claim 16, further comprising verifying a degree of accuracy of the replay by comparing the final state of the first processing system to a final state of the second networked processing system.

22. The method of claim 16, wherein data in the initial state includes meta data, and wherein the final state is determined after the capturing of the live network traffic.

23. The method of claim 17, wherein the meta data includes a data block layout used by the first processing system to store the original dataset.

24. A processing system configured to capture real-time data at a first network to use at a second network for determining a performance characteristic of the first network, the processing system comprising:
- a processor;
- a capture module configured to, when executed by the processor, collect the real-time data of a first processing system on the first network, wherein the real-time data includes a command having payload data, wherein the capture module determines an initial and final state of the first processing system, and wherein the capture module operates independently of a storage protocol used by the command;
- a data security module configured to, when executed by the processor, generate hashed values of the payload data, the initial state and the final state, wherein an original content of the payload data cannot be identified from the hashed value of the payload data;
- a replay module configured to simulate the real-time data of the first processing system by sending the command for delivery to a second processing system at the second network to cause the second network to simulate a live network traffic of the first network using the command, the command having a hashed value of the payload data; and
- an analysis module configured to, when executed by the processor, determine a performance characteristic of the first processing system on the first network, based on a response of the second processing system of the second network to the command for delivery to the second processing system.

25. The processing system of claim 24, further comprising determining the performance characteristic of the first network based on a response of the second processing system to the command.

26. The system of claim 24, wherein the initial state includes a copy of a portion of the payload data and associated meta data stored by the first processing system at a time before the collection of the real-time data, and wherein the final state includes a copy of data and associated meta data stored by the first processing system at a time after the collection of the real-time data.

27. The system of claim 26, wherein the second processing system has a file system created from the initial state of the first processing system.

28. The system of claim 24, wherein a response of the second processing system to the command sent by the replay module is verified by comparing the response of the second processing system with a response determined from the collected real-time data of the first processing system.

29. The system of claim 24, wherein the replay module verifies an accuracy of the simulated real-time data sent for delivery to the second processing system by comparing the final state of the first processing system to a final state of the second processing system.

30. The system of claim 29, wherein verifying the accuracy of the simulated real-time data includes determining an incomplete or missing original command and creating a replacement command for the incomplete or missing original command, based on data of the initial state and the final state of the first networked processing system.

31. The system of claim 24, wherein the performance characteristic of the first processing system on the first network indicates that a file being requested multiple times by a client of the first processing system causes a degradation of performance of the first processing system, and wherein the performance can be improved by a cache system within the first network having the file.

* * * * *